(No Model.) 6 Sheets—Sheet 1.
T. F. DUNN.
SPINNING AND ROVING MACHINE.

No. 551,924. Patented Dec. 24, 1895.

WITNESSES: M. F. Bligh. Chas. H. Luther Jr.

INVENTOR: Thomas F. Dunn, by Joseph A. Miller & Co., Attys.

(No Model.) 6 Sheets—Sheet 2.

T. F. DUNN.
SPINNING AND ROVING MACHINE.

No. 551,924. Patented Dec. 24, 1895.

WITNESSES:
M. F. Bligh.
Chas. H. Luther Jr.

INVENTOR:
Thomas F. Dunn,
by Joseph A. Miller & Co.
Attys.

(No Model.)

T. F. DUNN.
SPINNING AND ROVING MACHINE.

No. 551,924.

6 Sheets—Sheet 4.

Patented Dec. 24, 1895.

WITNESSES:
M. F. Bligh.
Chas. H. Luther Jr.

INVENTOR:
Thomas F. Dunn,
by Joseph A. Miller & Co.,
Attys.

(No Model.) 6 Sheets—Sheet 5.
T. F. DUNN.
SPINNING AND ROVING MACHINE.
No. 551,924. Patented Dec. 24, 1895.
Fig. 5.
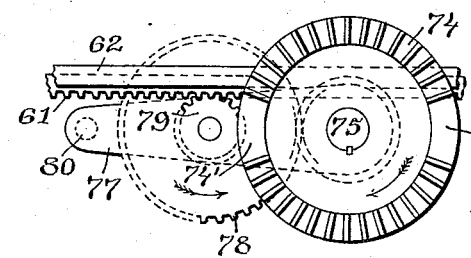
Fig. 8.
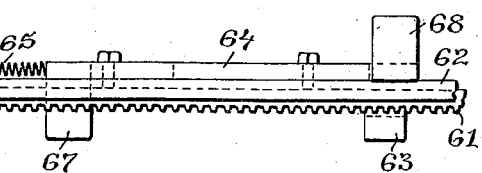
Fig. 6.
Fig. 9.
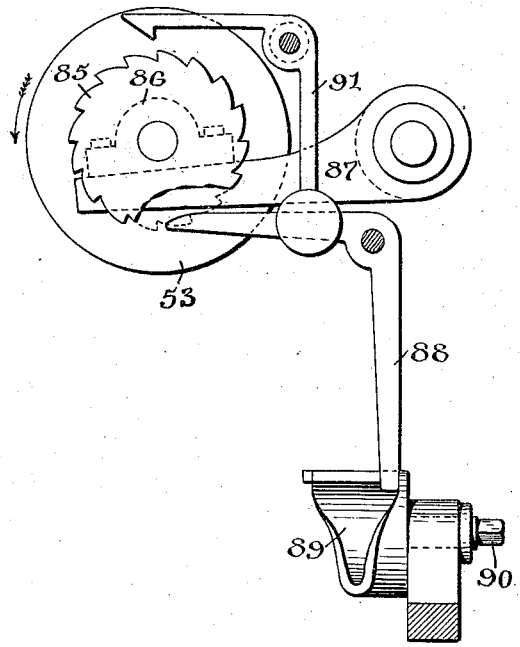
Fig. 7.
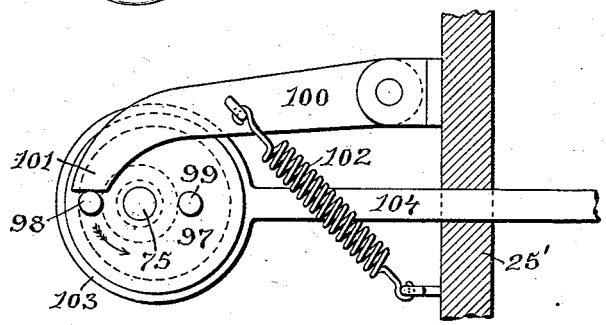
WITNESSES:
M. F. Bligh.
Chas. H. Luther Jr
INVENTOR:
Thomas F. Dunn,
by Joseph A. Miller & Co.,
Attys.

(No Model.)    6 Sheets—Sheet 6.

T. F. DUNN.
SPINNING AND ROVING MACHINE.

No. 551,924.    Patented Dec. 24, 1895.

WITNESSES:
M. F. Bligh.
Chas. H. Luther Jr.

INVENTOR:
Thomas F. Dunn,
by Joseph A. Miller & Co.,
Attys.

UNITED STATES PATENT OFFICE.

THOMAS F. DUNN, OF PAWTUCKET, RHODE ISLAND.

SPINNING AND ROVING MACHINE.

SPECIFICATION forming part of Letters Patent No. 551,924, dated December 24, 1895.

Application filed May 1, 1895. Serial No. 547,766. (No model.)

*To all whom it may concern:*

Be it known that I, THOMAS F. DUNN, of the city of Pawtucket, in the county of Providence and State of Rhode Island, have invented certain new and useful Improvements in Spinning and Roving Machines; and I hereby declare that the following is a full, clear, and exact description of the same, reference being had to the accompanying drawings, forming part of this specification.

This invention has reference to improvements in that class of machines for treating fibrous material in which the material is wound onto spools or bobbins, either by the rotation of that portion onto which the material is wound by the rotation of some other mechanism, as a flier, to wind the material onto a receiving device, or by the rotation of both of these parts.

The machines of this nature to which my improvements are particularly adapted are "roving-frames," so called.

The object of the invention is to simplify and render more practically operative the portions of a spinning or roving machine, as hereinafter claimed.

To this end the invention consists in the peculiar features of construction and combination of parts, as will hereinafter be more fully described, and pointed out in the claims.

Figure 1:
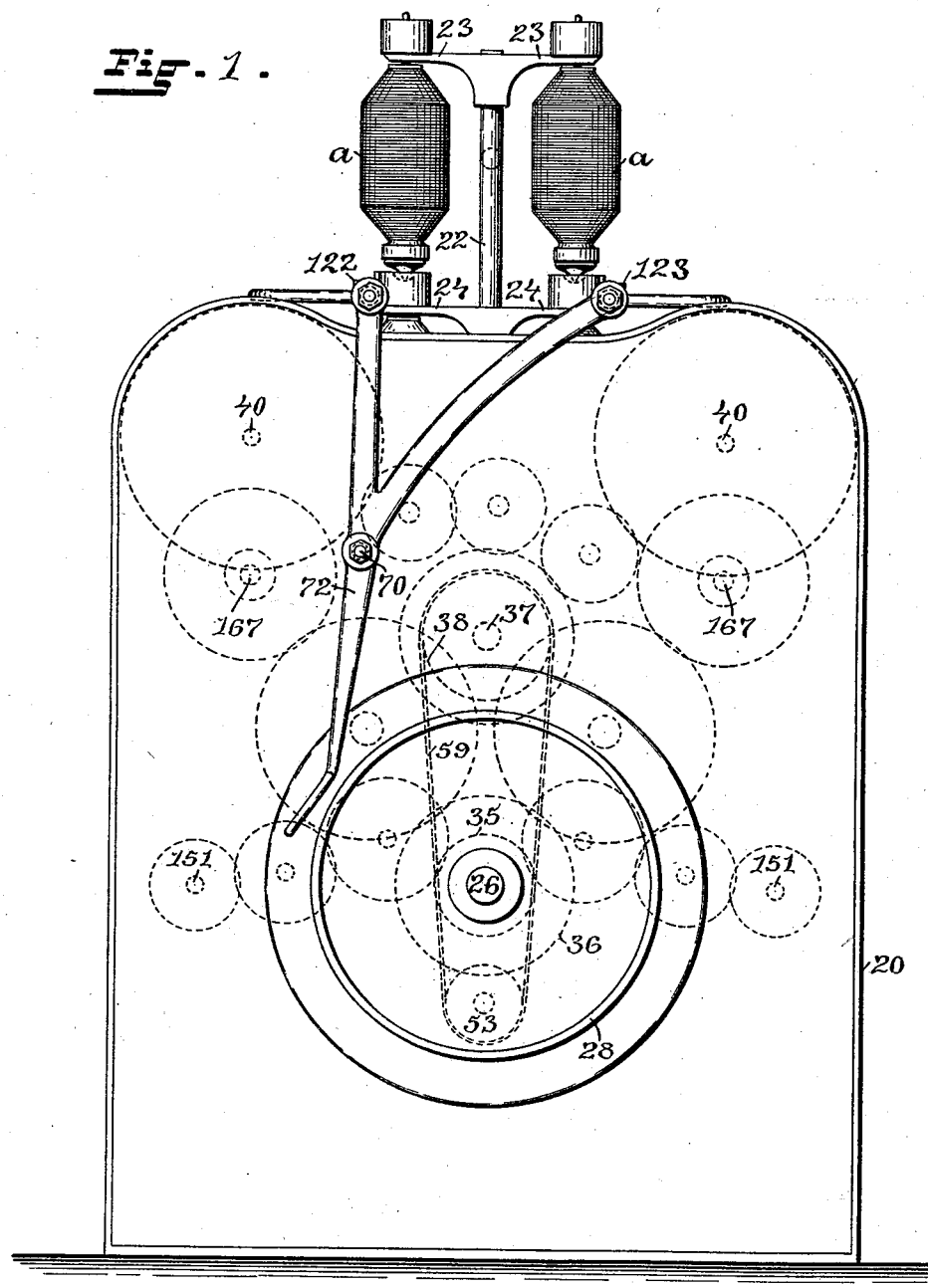
Figure 2:
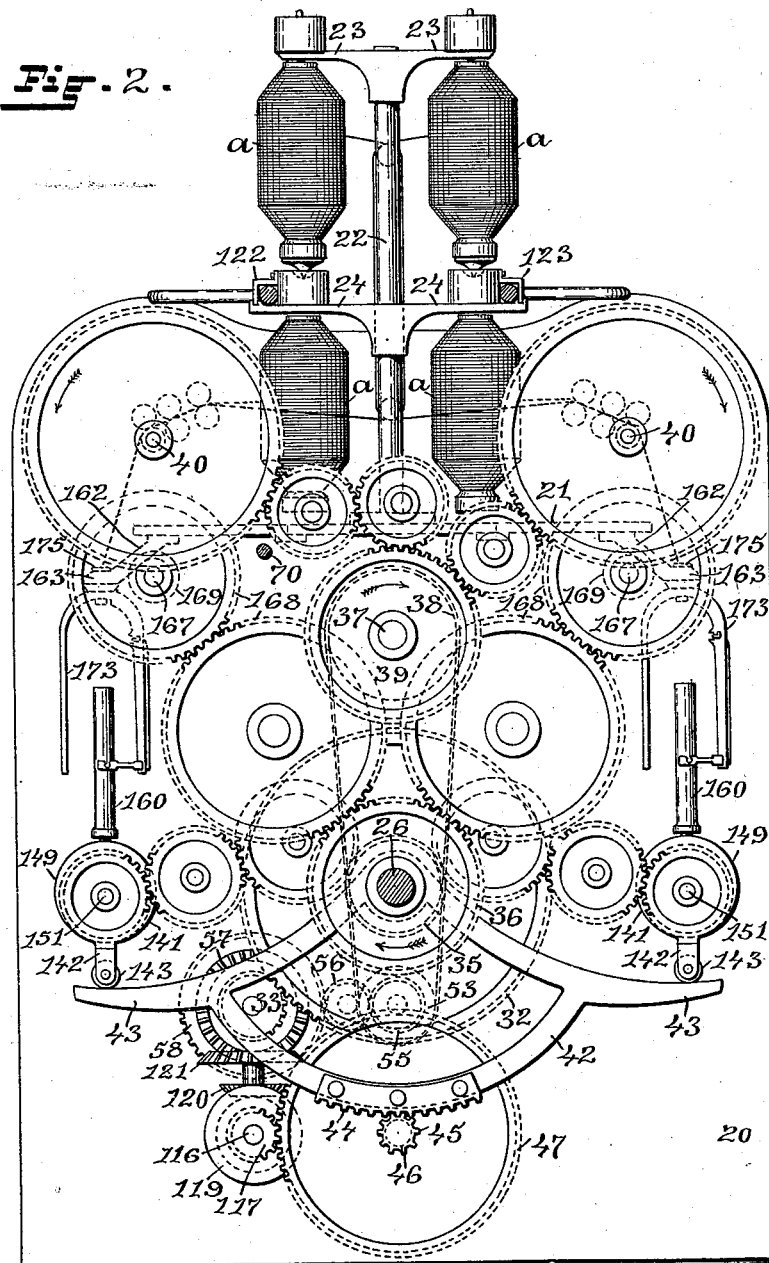
Figure 3:
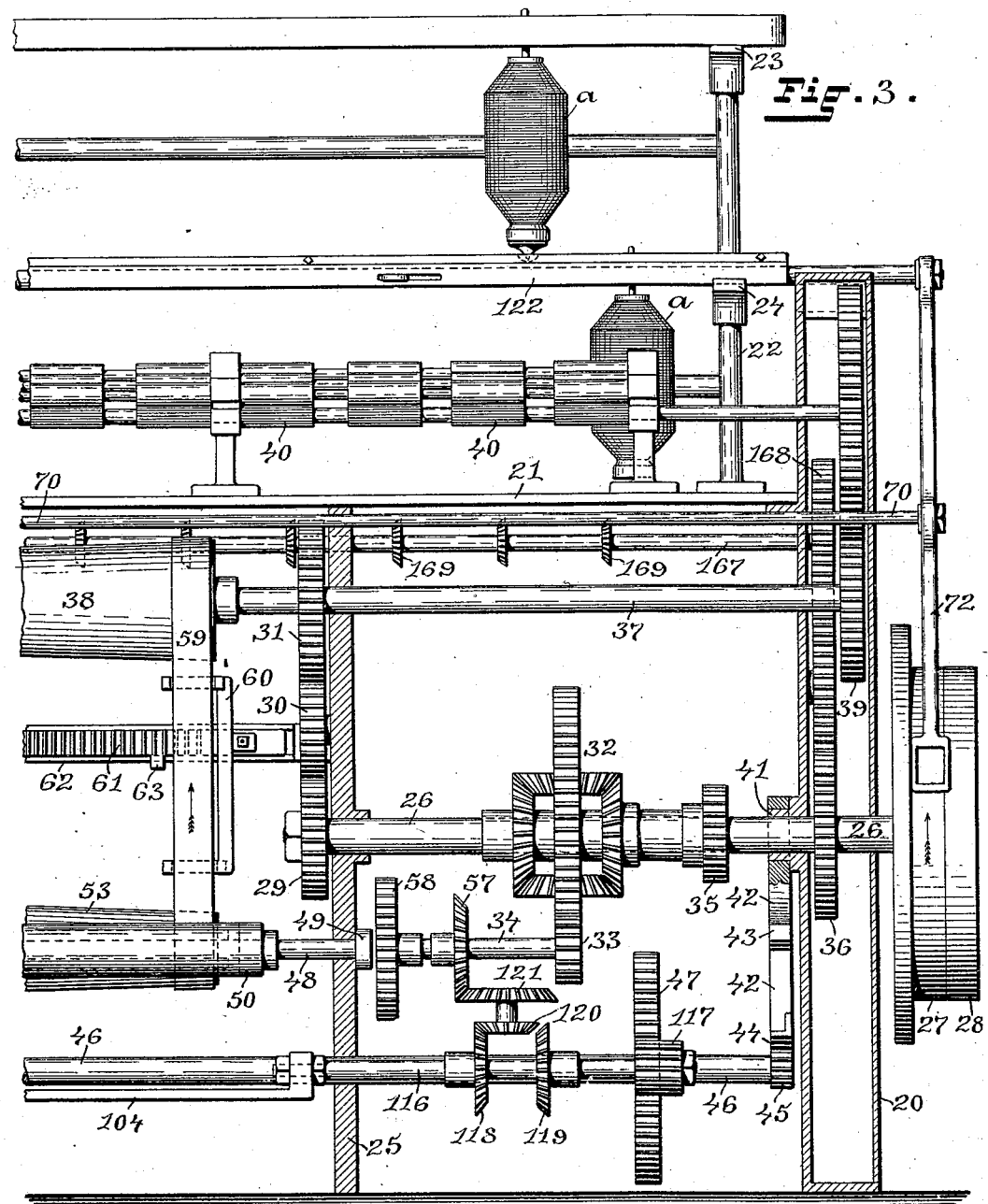
Figure 4:
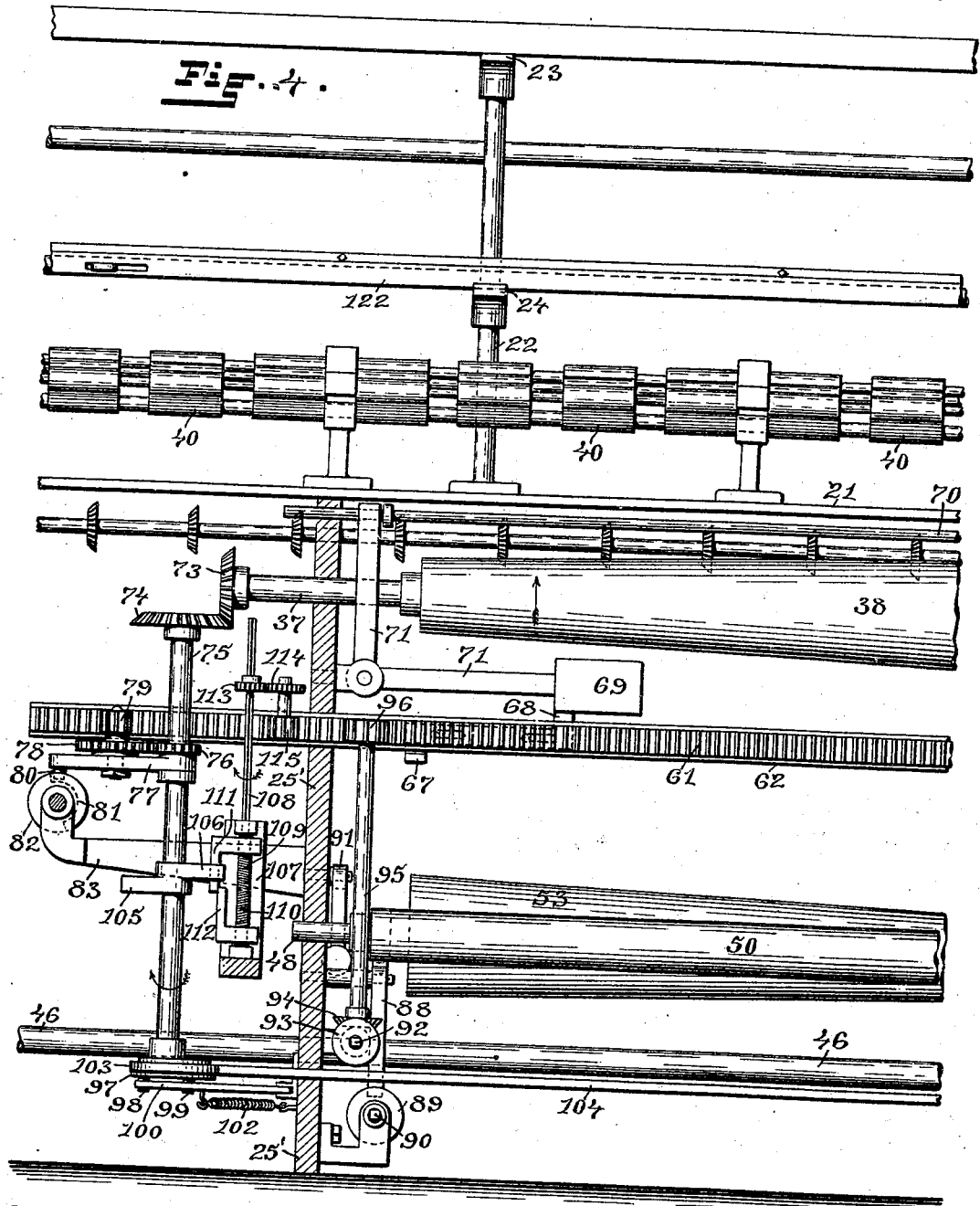
Figure 10:
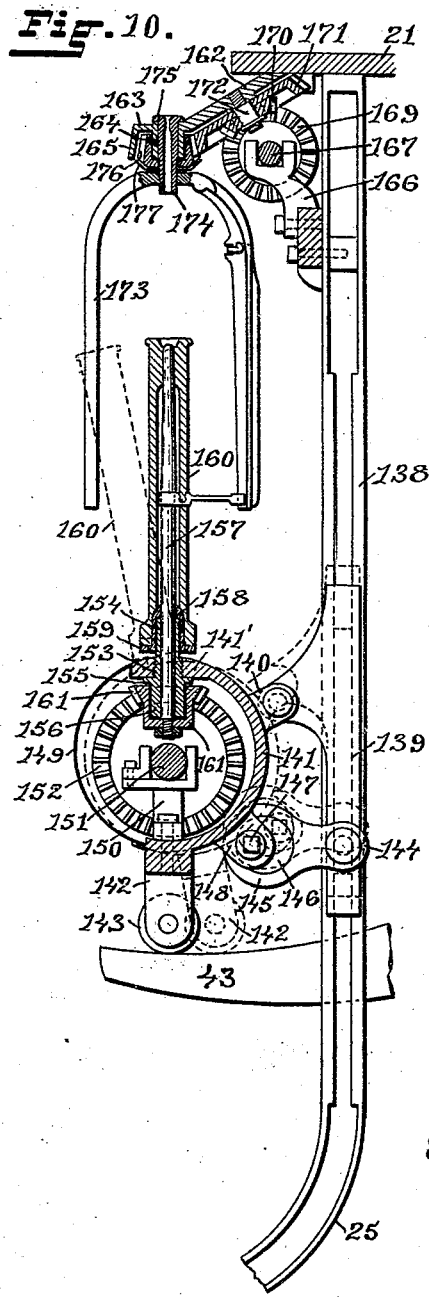
Figure 11:
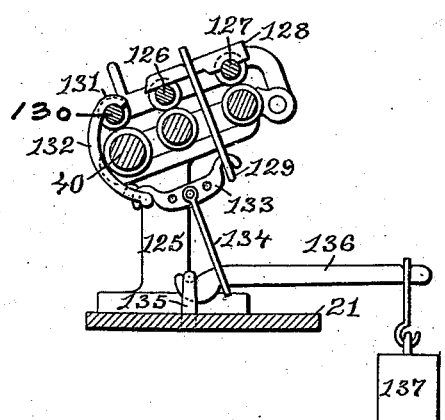
Figure 12:
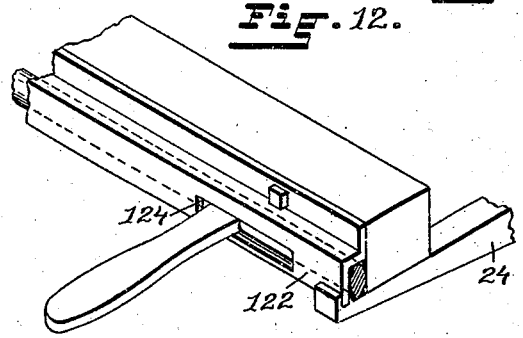
Figure 13:
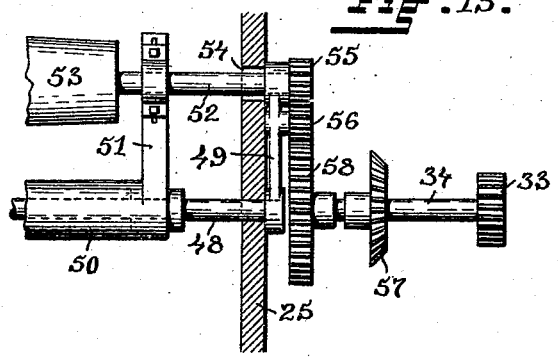

Figure 1 represents an end view of the improved machine, showing the shipper connected with both of the shipper-rods. Fig. 2 represents a vertical end section showing the gears connecting the drive-shaft with the cone-shafts, the top rolls, the flier-driving mechanism, the spindle-driving gear, and from the bobbin change-gear to the rail-lift for actuating the spindle-rails in the building operation and the reversing motion therefor. Fig. 3 represents a vertical longitudinal section of a portion of the machine, showing the forward ends of the cones. Fig. 4 represents a similar view showing the rear ends of the cones with the connections from the upper cone-shaft through the dog-shaft to the connecting-rod, through the dog-shaft to the bobbin-tapering device, and through the dog-shaft to the tension-gear and cone-rack, showing the swinging arm on which the tension-gear is mounted. Fig. 5 represents a detail plan view of the connection from the dog-shaft through the tension-gear to the cone-rack. Fig. 6 is a detail view of the cam for actuating the swinging arm and for locking it in the engaged or open position. Fig. 7 represents a bottom view of the dog-shaft eccentric, the reversing-arm connected thereto by a strap, and the pawl. Fig. 8 represents a detail view of a portion of the cone-rack and its knock-off device for releasing the shipper-arm weight to automatically ship the driving-belt at the end of the frame. Fig. 9 represents details of the lifting and holding devices for the lower cone, to lift the cone away from the belt and to hold it from rotation during the doffing. Fig. 10 represents a vertical sectional view of portions of the machine, showing the traversable bracket, the spindle-rail and the manner in which it is supported and is connected with the bracket, the flier-rail with the flier and the driving mechanism therefor. Fig. 11 represents a sectional view of the rolls and the saddles and weighting devices therefor. Fig. 12 represents a detail view of the shipper-rod movable in a guide on the creel-brackets. Fig. 13 is a plan view showing the connections between the lower cone-shaft and the change-shaft.

Similar numbers and letters of reference designate corresponding parts throughout.

In roving-machines the driving of the spindles and fliers positively necessitates a large amount of gearing and shafts between the main drive-shafts and these parts, whereby much power is wasted in transmission. To remedy these defects and others, the cone-driving mechanism, the building devices, and the reversing and other mechanisms brought into use in operating the machines, or in the doffing process, are herein sought to be perfected.

Spinning, roving, and drawing frames are, it is thought, by the present improvements of the spindle-rails and their correlative mechanisms brought to a higher state of perfection in their functional relation to the material acted upon than as heretofore constructed.

In the drawings, 20 indicates one of the end samsons between which the mechanism extends, being intermediately supported by smaller frames or samsons. On these smaller samsons is supported the table-top 21, the edge portions of which form the roller-beams, and on the table-top is mounted the usual creel-frame 22, having the laterally-extending arms 23 23 and 24 24, between which the bobbins *a a* from the slubbing-frame are rotatably supported, so that the rove may be drawn therefrom without stretching.

The samson 20 is of box-like construction and in it, as well as in the first small samson 25, is journaled the main drive-shaft 26, provided at its outer end with the tight pulley 27 and the loose pulley 28. At its inner end is the twist-gear 29, connected by the idle-pinion 30 with the gear 31 on the upper cone-shaft. On the central portion of the drive-shaft, or connected therewith, is the differential gear 32 of any usual construction, which connects by the gear 33 with the change-shaft 34, suitably mounted, and through the gear 35 with the spindle-driving mechanism to drive the spindles at a speed determined by the location of the cone-belt on the cones.

Within the samson 20 to the shaft 26 the flier drive-gear 36 is secured, this gear connecting through a suitable train of gears with the two rows of fliers to drive them positively and at a constant speed.

On the upper cone-shaft 37, which is journaled in the small samsons and carries the upper cone 38, is the gear 39, which is connected through the usual gears with the front drawing-rolls 40 40 that these may be positively driven.

Embracing the shaft 26 at the portion journaled in the samson 20 is the sleeve-bearing 41, on which the rail-lift 42 is pivotally mounted. This rail-lift has the lever-arms 43 43 and is furnished at its lower portion with the rack 44, which is engaged by the pinion 45 on the rail-lifting shaft 46, extending through a portion of the machine in bearings and furnished with the gear 47. Any number of the rail-lifts may be used.

In the samsons 25 and 25′ is mounted the shaft 48, provided at its near end with the arm 49. On this shaft is rotatable the sleeve 50, having lateral arms, as 51, in which the lower cone-shaft 52, carrying the lower cone 53, is journaled, the cone-shaft also extending through a radial slot 54 in the samson 25, whereby it may swing on the shaft 48 and through a collar on the end of the arm 49, being provided with the gear 55 beyond this collar. On a stud in the arm 49 is journaled the idle-gear 56, which takes into the gear 55 of the lower cone-shaft.

The change-shaft 34 is journaled in suitable bearings having the gear 33, engaging with the differential or compound 32, the bevel-gear 57 through which connection is made to the traverse-reversing mechanism, and the gear 58, intermeshing with the idle-gear 56. The shafts 34 and 48 being in axial alignment, it will be seen that the cone-shaft 52 may be swung upward or downward without disengaging its gear 55 from the gear 58 of the change-shaft 34.

The cones 38 and 53 are arranged in the usual manner—that is, with the large diameter of one opposite the small diameter of the other. For transmitting the motion of one to the other an endless belt 59 is used. This belt is controlled by a shipper 60, mounted on the cone-rack 61, reciprocally supported in the guide 62 and having the projection 63.

At the farther end portion of the guide 62 is movably mounted the reciprocating rod 64, held in its forward position by the spring 65, bearing against the projection 66 on the back of the guide and against the rod, and having the finger 67, adapted to be engaged by the projection 63 of the rack, and the step 68 for supporting the shipper-weight 69, connecting with the automatic shipper-rod 70 by means of the pivoted bell-crank lever 71, so that the dropping of the weight 69 by the removal of the step 68 will actuate the rod 70 to ship the drive-belt from the pulley 27 to that marked 28 by means of the shipper-lever 72, the connection between the rod 70 and the shipper-lever allowing sufficient play to permit of the shipper-lever being moved in this same direction by hand without affecting the weight 69 or its lever. The connection being now established from one cone to the other, it will be seen that as the drive-shaft 26 is rotated the upper cone 38 is driven at a constant speed through the gears 29, 30, and 31. At the same time the front roll will be likewise rotated through the gear 39 and the top-roll gears, while the flier drive mechanism will be similarly operated through the gear 36 on the drive-shaft. In thus driving the drawing and winding devices the usual provision for reducing the speed of the bobbins in proportion to the increase in diameter of the same by the yarn wound thereon is necessary, this being effected by the shifting of the belt to drive from the larger diameter of the upper cone and the smaller diameter of the lower cone to the smaller diameter of the upper cone and larger diameter of lower cone, and to utilize this change of speed through the change-shaft 34, the gears between this and the lower cone, thence through the compound or differential gear 32 to the gear 35, and through the same to the spindle-driving mechanism.

At the farther end of the upper cone-shaft 37 is secured the bevel-gear 73, which intermeshes with the bevel-gear 74 on the upper end of the dog-shaft 75. This shaft 75 is vertically journaled in bearings and is furnished with the gear 76 and the arm 77, which swings around the axis of this gear. On the arm is journaled the gear 78 to which the tension-gear 79 is secured. As the tension-gear takes into the cone-rack 61 and serves to operate the same to determine the speed of the spindles, it will be evident that the size of the tension-gear is of material importance to the tension exerted by the spindles on the roving.

To effect the positive removal of the tension-gear 79 from the rack, I provide the outer end of the arm 77 with a pin 80, which engages in the cam-groove 81 of the cam 82, which is journaled in the bracket-arm 83, secured in the frame, and is rotated by the hand-wheel 84, whereby the arm 77 is shifted to disengage the tension-gear from the rack, while the cam-groove is of such a shape as to lock the pin 80 at both ends of the groove.

The releasing of the tension-gear from the cone-rack is necessary when the cone-rack is shipped backward at the time of doffing. To accomplish this the lower cone must be first raised from contact with the cone-belt. For this purpose I furnish the lower cone-shaft at the larger end of the cone with the ratchet 85, and between this ratchet and the cone I place the bearing 86, which is carried by the pivoted lever 87. Below the lever 87 is pivoted the bell-crank lever 88, one arm of which bears against and sustains the lever 87 while its depending arm is engaged by the cam 89, mounted on a shaft journaled at the lower portion of the machine and having a square end 90 with which a crank may engage. The rotation of the cam in one direction serves to actuate the levers 88 and 87 to raise the cone and its ratchet 85 to a position where the pivoted pawl 91 may engage the ratchet and prevent the rotation of the cone in the direction indicated by the arrow in Fig. 9 of the drawings.

When the lower cone has been thus elevated and is sustained, a key or crank is applied to the end 92 of a shaft journaled in bearings adjacent to the cam 89 and having a bevel-gear 93. The rotation of this shaft and gear is imparted through the bevel-gear 94 to the vertical shaft 95 and its gear 96 to reciprocate the rack backward, it being understood that at this time the tension-gear 79 is disengaged from the rack.

Returning now to the dog-shaft 75, and referring to Fig. 5 of the drawings, it will be seen that the gear 74, at the upper end of the shaft, has spaces 74' 74' which are not provided with teeth. When, therefore, this gear is rotated sufficiently to bring either of these spaces opposite to the gear 73 the connection between these gears will be broken and the rotation of the gear 73 will have no effect on the gear 74. This occurs twice in each rotation of the dog-shaft 75 and its gear 74.

To rotate the shaft 75 when the teeth of the gear 73 are in the spaces 74' of the gear 74, I secure to the lower end of the shaft 75 an eccentric 97 having the pins 98 and 99 extending therefrom. To the samson 25' is pivoted an arm 100 having a curved bearing end 101 adapted to alternately bear on the pins 98 and 99 and through the spring 102 to exert a pressure thereon tending to rotate the dog-shaft, the curving inner edge of the arm serving as a cam riding on the pins alternately to throw the free end of the arm outward in position to engage the pin as the dog-shaft is positively rotated from the gear 73. Embracing the eccentric 97 is the strap 103 having the connecting-rod 104.

It will be evident that it is necessary to regulate the intervals at which the spring 102 is permitted to act on the arm 100 and thence through the pins to rotate the dog-shaft and through the connecting-rod 104 to reverse the traverse motion, or the traverse would be limited to the time of the half-rotation of the dog-shaft 75, and the traverse being constant no tapering of the bobbins would occur.

To regulate the rotation of the dog-shaft 75 I secure to the shafts the oppositely-extending dogs 105 and 106, which are adapted to be intercepted in the rotation of the dog-shaft by the regulator. The regulator consists of a bracket 107 supported by an arm which is secured to a portion of one of the spindle-rails or other traversable part of the machine having an up-and-down movement equal to that of the spindle-rail or some proportion thereof. In the bracket 107 is mounted a shaft having the upper square portion 108 and the lower oppositely-threaded portions 109 and 110. On these screw-threaded portions are the intercepting fingers 111 and 112 which, by the rotation of the screw-threaded shaft, work in opposite directions thereon, being prevented from rotating with the shaft by the shape of the bracket. The square shaft 108 is free to move upward or downward in a square bearing of the gear 113, but is rotated by this gear, which is suitably journaled and is driven through the gears 114 and 115, the one engaging in the gear 113 while the other intermeshes with the cone-rack.

It will be seen that as the rack is driven forward it will cause the gears 115, 114, and 113 to rotate, thus rotating the shaft 108, and, through the action of the oppositely-extending screw-threads, the fingers 111 and 112 will be gradually drawn together so that at each rotation of the shaft 108 the obstruction to movement of the dogs 105 and 106 is reduced, the building of a layer of yarn on the bobbins being in process while the dog-shaft is thus held from rotation.

When the dogs 105 and 106 are allowed to swing past the regulating-fingers 111 and 112, the spring 102 tends to rotate the dog-shaft through its connection therewith, and, by means of the eccentric 97 and its strap 103, the connecting-rod 104 is reciprocated and acts to reciprocate the shaft 116, carrying the broad-faced pinion 117, in engagement with the pulley 47 of the rail-lifting shaft. On this shaft 116 are also secured the oppositely-beveled gears 118 and 119, which are adapted to be alternately engaged by the bevel-gear 120 to drive the shaft 116 alternately in opposite directions and through the gears 117, 47 and 45 and the shaft 46 to transmit this change of direction to the rail-lifter 42, the gear 120 being in turn driven through the gear 121 taking into the gear 57, so that the rail-lift is operated in a reduced degree at each reversal thereof.

To the outer ends of the creel-arms 24 24 at both sides of the machine are secured the box-guides 122 and 123, which are provided at intervals with openings, as 124. In these guides are reciprocal shipper-rods having handles which extend out through the openings 124 in the guides. The shipper-rods are secured at the driving end of the machine in the branches of the shipper-lever 72. This location and arrangement of the shipper-rods and their bearings allows of more ready access to the lower bobbins or creel-spools and permits the shipper-handles to extend farther outward over the roller-stands without interfering with the rows of roping in front.

On those outer portions of the table-top 21, which form the roller-beams, are mounted the roller-stands 125 of the usual construction and carrying the top and under rolls. Bearing on the reduced portions of the rear end intermediate top rolls 126 and 127 are the saddles 128, provided with shortened stirrups 129, having engageable portions at their lower ends. On the reduced portions of the front rolls 130 rest the hook portions 131 of the curved stirrups 132, also having engageable lower ends, and in these ends of the stirrups are engaged the ends of the yoke 133, having a series of perforations to receive a pin or pivot by means of which the connecting-link 134 may be adjustably secured to the yoke 133 to bring a strain at the center of the yoke or at either end. To the roller-beam is secured a series of slotted studs 135, in which the hooked ends of the levers, as 136, may engage. These levers extend through the links 134 and are furnished with weights 137 adjustable on the levers to increase or diminish the pressure on the saddles.

Formed in part with the samsons, or secured in the machine in any suitable manner at both sides, are vertical guides, as 138, and traversably mounted in these guides are bracket-plates, as 139. To the bracket-plates are pivotally secured the ears 140 of the hollow spindle-rails 141. These rails have also the depending arms 142, provided with roller-bearings 143, which ride on the arms 43 of the rail-lift 42, as many of these rail-lifts being employed as are necessary to effectually support the spindle-rails. To each of the bracket-plates 139 is suitably secured an arm 144, having a ring-bearing 145 at its outer end, and in this ring-bearing is rotatable a disk 146, in which is eccentrically secured the shaft 147, having a squared end to receive a key or crank. This shaft being journaled in the ears 148 of the spindle-rail, it will be evident that by the sufficient rotation of the shaft and of the eccentric-disks 146 the lower portion of the spindle-rail may be drawn toward the samsons, causing the tipping outward of the upper portion of the rail and the spindles carried thereby.

The spindle-rails are generally circular in cross-section, but may be of any desirable shape. Their narrow portion, from which the attaching-ears extend, is preferably of strong and durable construction, while the front portions may consist of removable convex covers 149, by the opening of which access may be had to the interior of the rail. To the lower portion of the rail is secured a series of bearing-brackets 150, in which the shaft 151 is journaled. The upper portion of the rail has the thickened portion 141', through which screw-threaded perforations are formed to receive the bolsters.

The driving mechanism between the shafts 151 and the gear 35 is of the usual character, consisting in gears journaled on movable bearings, so that at all times during the traverse of the spindle-rails driving connection is maintained with the spindle-shafts 151 and the bevel-gears 152 mounted on this shaft.

In the perforations of the portion of the spindle-rail 141' are screwed the bolster-bearings 153, having a plane portion 154 extending above the rail, the abutting flange 155 bearing against the lower inner surface of the rail, and the sleeve 156 depending below the flange and forming a bearing to embrace the spindle and a bearing to be embraced by a portion of the driving mechanism. The upper end of this bolster is adapted to serve as a step-bearing.

The spindle 157 is much reduced in size from that ordinarily used in machines of this character. This is one of the important results from separating the flier from the spindle and driving them independently. On the spindle is rigidly secured the inverted-cup-shaped bearing 158, the upper inner surface of which rests on the upper end of the bolster-bearing and sustains the spindle, while the lower flanged portion 159 is adapted to support the bobbin 160, and may have a key or lip to engage the lower portion of the same.

On the lower end of the spindle is secured the cup-shaped gear 161, having pinion-teeth to engage the gear 152, or arranged in any suitable manner to be driven to rotate the spindle. This cup-shaped gear 161 embraces the depending portion 156 of the bolster-bearing and tends also to the more perfect balancing of the spindle from the fact that not only is the bearing of the spindle on the internal surface of the bolster-bore, but, by means of the cup-gear, it also bears on the outer surface of the pendent portion 156, while the power is applied to the spindle at a point above the lower end of its bearing. In this respect attention is also called to the inverted cup-bearing 158 and to the large proportion of the bolster which is embraced by such cup. This construction also allows the bolster to be screwed directly to the rail and dispenses with the usual nut for securing the same in position.

By reference to the drawings, Fig. 10, it will be seen that the spindle-rail is adapted to contain the spindle-shaft with its driving connection to the spindles, and to protect them from flying lint and dust which, generally, surround machines of this character when in operation.

Secured to the machine, intermediate the spindle-rails and the drawing-rolls, is a flier-rail or support for the fliers which is primarily adapted to support the fliers in operative positions independent of the spindles. This rail is preferably fixed, but may be arranged in any suitable manner to accomplish the objects for which the machine is designed.

In the preferred construction the flier-rails are secured just below the roller-beams, having inclined portions 162, to serve as covers to protect the flier-driving mechanism, and the rails proper 163, having the depending bearing-sleeves 164 and lips 165, also serving to protect the driving mechanism.

Below the inclined portion 162 of the flier-rail the bearing-brackets 166 are secured to the machine-frame, and in these brackets are journaled shafts, as 167, driven through trains of gears 168 168 from the gear 36 on the main drive-shaft 26. On the shafts 167 are mounted bevel-gears 169 169, which engage in the pinions 170 of the stud-gear 171, rotatably mounted on the studs 172, which are secured in the inclined portion of the flier-rail.

The fliers are of the usual construction in so far as they have hollow legs through which the roving may pass, one of the legs of each flier being provided with a compressor-arm. In its preferred form the flier 173 has an axially-disposed tubular guide 174, which is journaled in one of the bearing-sleeves 163 of the flier-rail and having an upper flange 175 serving as a bearing to rotatively sustain the flier in position. To the guide 174 is secured the cup-shaped gear 176, which embraces the lower portion of the bearing-tube 163, while its pinion-teeth intermesh with the gear 171. Below the gears 176 is a drip-trough 177, through perforations in which the guides 174 extend, this trough being adapted to catch any lubricant from the gears 171 and 176 to prevent its falling onto the roving on the bobbins.

Having thus described my invention, I claim as new and desire to secure by Letters Patent—

1. In a spinning or roving machine, the combination with the cone-rack, a vertical shaft journaled in bearings adjacent thereto, the upper cone-shaft, a gear connection from the cone-shaft to the vertical shaft, and the gear 76 on the vertical shaft, of the arm 77 pivotally mounted on the vertical shaft and having the pin 80, a shaft carried by the arm, the gears 78 and 79 journaled on the shaft and adapted to act as a connection between the gear 76 and the cone-rack, the bracket 83 mounted in the machine, the cam 82, journaled therein, having the cam-groove 81 in which the pin 80 is engaged, and the hand-wheel 84 for rotating the cam.

2. In a spinning or roving machine, the combination with the lower cone, its shaft mounted in movable bearings so that the cone may be raised and lowered, and a ratchet secured to the cone-shaft, of the pivoted arm 87 bearing beneath the cone-shaft, the pivoted bell-crank-lever 88 the lateral arm of which is adapted to bear on the arm 87, the cam 89, rotatably mounted in the machine, against the cam-face of which the depending-arm of the bell-crank-lever bears, and the counter-weighted pawl 91 pivotally mounted above the lower cone-shaft and adapted to engage the ratchet 85 when the cone and its shaft are raised.

3. In a spinning or roving machine, the open spindle-rail 141 having the upper portion 141', and a cover for closing the open portion of the rail.

4. In a spinning or roving machine, the combination with the spindle-rail, and the bolster-bearing 153 having the upper portion 154, the flange 155 and the sleeve 156, of the spindle 157 journaled in the bolster-bearing and having the inverted cup-shaped bearing 158, and the cup-shaped gear 161, rigidly secured to the lower portion of the spindle, embracing the depending sleeve of the bolster-bearing and adapted to be positively driven by gears.

5. In a spinning or roving machine, the combination with a cone-rack having the projection 63, and the guide in which the rack is movable, of a rod mounted to reciprocate on the back of the guide and having a weight-sustaining step and an intercepting finger 67 adapted to be engaged by the projection on the rack to move the rod, a pivoted bell-crank lever having on one arm a weight adapted to be normally supported by the step of the rod, a shipper-rod movable in bearings connected with the bell-crank-lever, and a shipper-lever adapted to be actuated by the shipper-rod.

6. In a spinning or roving machine, the combination with the lower cone-shaft journaled in swinging bearings, a gear on the cone-shaft, an arm pivoted to swing in unison with the cone-shaft and having a collar embracing this shaft, and an idle gear rotatable on the arm and engaging the gear on the cone-shaft, of the change-shaft journaled in axial alignment with the axis on which the cone-shaft swings, a large gear on the change-shaft intermeshing with the idle-gear, a small gear on this shaft, and a differential motion with which this small gear is connected.

7. In a spinning or roving machine, a hollow spindle-rail of essentially circular cross-section having a depending arm provided with a roller-bearing, a rail-lift on which the roller-bearing is supported, a traversable bracket to which an ear on the rail is pivoted, an arm extending from the lower portion of the traversable bracket, an eccentric disk rotatable therein, a shaft eccentrically secured in the eccentric disk and having an engageable portion, and an ear, extending from the lower portion of the rail, in which the shaft is journaled.

8. The combination with the guide 138, the bracket 139 traversable therein, the rail 141 having the ear 140 pivoted to the bracket, the arm 144 extending from the bracket and having the ring-bearing 145, the eccentric-disk 146 rotatable in said ring, the shaft 147 rigidly secured to the eccentric-disk, and the ear 148 in which the shaft 147 may rotate, of means for traversing the rail 141, as described.

9. The combination with the machine frame, and the flier-rail secured thereto and having the inclined portion 162, the straight portion 163 and the lip 165, the said straight portion being furnished with depending bearing-sleeves, of the shaft 167 journaled in bearings on the frame and having the bevel-pinions 169, the pinions 171 journaled on studs secured in the inclined portions of the flier-rail and having the pinions 170 intermeshing with the bevel-pinions 169, the fliers having guides 174 journaled in the bearing-sleeves, and the cup-shaped pinion-gear 176 embracing the bearing-sleeves and engaged by the pinions 171, as and for the purpose described.

In witness whereof I have hereunto set my hand.

THOMAS F. DUNN.

Witnesses:
HENRY J. MILLER,
JOSEPH A. MILLER, Jr.